United States Patent
Suzuki et al.

[11] Patent Number: 5,925,877
[45] Date of Patent: Jul. 20, 1999

[54] OPTICAL BEAM SPATIAL PATTERN RECORDING DEVICE

[75] Inventors: Kazutaka Suzuki; Teruo Takeshita; Koro Uchiyama, all of Hamamatsu, Japan

[73] Assignee: Hamamatsu Photonics K.K., Hamamatsu, Japan

[21] Appl. No.: 08/968,530

[22] Filed: Nov. 12, 1997

[30] Foreign Application Priority Data

Nov. 13, 1996 [JP] Japan .................................. 8-301751

[51] Int. Cl.⁶ ...................................................... H01J 40/14
[52] U.S. Cl. ...................................... 250/214 VT; 313/529
[58] Field of Search ............................ 250/214 VT, 207, 250/214 R; 313/529, 530, 103 CM, 105 CM

[56] References Cited

U.S. PATENT DOCUMENTS

| | | | |
|---|---|---|---|
| 4,740,685 | 4/1988 | Koishi | 250/214 VT |
| 4,801,796 | 1/1989 | Kinoshita et al. | 250/214 VT |
| 5,196,732 | 3/1993 | Takahashi et al. | 307/227 |
| 5,866,897 | 2/1999 | Nishizawa | 250/214 VT |

FOREIGN PATENT DOCUMENTS 0 299 465  1/1989  European Pat. Off. .
B2-4-38304  2/1992  Japan .

OTHER PUBLICATIONS

"Variation of Longitudinal Beam Profile During Acceleration in Tristan Main Ring", Kazuhisa Nakajima et al., National Laboratory for High Energy Physics, 1987. (No page No.; month unknown).

*Primary Examiner*—Que T. Le
*Attorney, Agent, or Firm*—Oliff & Berridge, PLC

[57] ABSTRACT

The pair of vertical deflection electrode plates 13 in the double sweeping streak camera are supplied with a voltage of a sawtooth wave in synchronization with the input optical beam pulses. The other pair of horizontal deflection electrode plates 14 are supplied with a voltage of a stepped wave in synchronization with the sawtooth wave. The deflection electrode plates 13 and 14 sweep successively-incident photoelectrons. The photoelectrons are then detected at the phosphor screen 16. The phosphor screen 16 is therefore recorded with temporal changes in the spatial pattern of the optical beam pulse as an image of regularly-arranged optical beam patterns. The image analyzing device can easily analyze the image.

9 Claims, 12 Drawing Sheets

OPTICAL BEAM SPATIAL PATTERN RECORDING DEVICE

BACKGROUND OF THE INVENTION

1. Field of the Invention

The present invention relates to an optical beam spatial pattern recording device capable of measuring temporal changes in a spatial pattern of an optical beam.

2. Description of Related Art

A synchrotron device repeatedly emits optical beam pulses with an ultra-short pulse width at a high repetition rate. In order to analyze this emission, it is necessary to measure not only temporal changes in intensity of the optical beam pulses but also temporal changes in a spatial pattern or profile of each optical beam pulse.

Conventionally, a streak camera is used to measure the temporal changes in the intensity of the optical beam pulses. In order to measure the spatial pattern of each optical beam pulse, a spatial pattern measuring device, such as a gating image amplifier tube, a high speed video pick up device, a framing camera, and the like is used.

The above-described spatial pattern measuring devices, however, have various problems. The gating image amplifier tube can pick up data only at a specific instance. The gating image amplifier tube may not obtain data continuously. Data pick up interval, at which the high speed video pick up device repeatedly picks up data, is too long to measure the ultra-short pulse width of the synchrotron radiation. The data pick up interval, at which the framing camera picks up data, can be sufficiently short. However, the framing camera can continuously pick up only as small as thirty images.

When using both the streak camera and one of the spatial pattern measuring devices, a special optical system has to be used for each of the streak camera and the spatial pattern measuring device. That is, two different optical systems, connected to the streak camera and the spatial pattern measuring device, are provided to divide the optical beam into two beams and then to guide them to the respective devices. Alternatively, when measuring temporal change in intensity of the optical beam, the optical system for the streak camera is provided to guide the optical beam to the streak camera. When measuring the spatial pattern of the optical beam, the optical system is replaced with another optical system for guiding the optical beam to the spatial pattern measuring device. The entire device becomes complicated. It is difficult to perform an accurate adjustment.

In order to solve the above-described problems, Japanese Patent Publication No.4-38304 discloses a streak camera of a type which can measure also the spatial pattern of each optical beam pulse. This streak camera can obtain a sufficient amount of data desired to be obtained, and can repeatedly pick up data at a sufficiently short time interval. This streak camera is of a double sweeping type in which two pairs of deflection electrodes are provided for deflecting photoelectrons in two directions which are perpendicular to each other. In this streak tube, voltages of sawtooth waves are applied both to the two pairs of deflection electrodes. Measurement is performed while voltages of sawtooth waves are switchingly applied to the two pairs of deflection electrodes.

A streak tube, employed in this streak camera, is an electron tube in which the two pairs of deflection electrodes are located between a photoelectric conversion portion and a photoelectron detection portion.

With this streak tube, the spatial pattern of each optical beam pulse is detected as described below.

When optical beam pulses fall incident on the photoelectric conversion portion of the streak tube, the photoelectric conversion portion emits photoelectrons in correspondence with the incident optical beam pulses. As a result, photoelectron pulses are generated. A pair of horizontal deflection electrode plates and a pair of vertical deflection electrode plates are supplied with electric voltages and generate electric fields on the passage of the photoelectron pulses from the photoelectric conversion portion to the photoelectron detection portion. As a result, the traveling path of the photoelectron pulses is bent. More specifically, the pair of vertical deflection electrode plates bend the traveling path of the photoelectron pulses in a first direction (vertical direction), and the pair of horizontal deflection electrode plates bend the traveling path of the photoelectron pulses in a second direction (horizontal direction) which is perpendicular to the first direction. Voltages of sawtooth waves are applied between the two pairs of the deflection electrode plates in synchronization with the inputted optical beam pulses.

SUMMARY OF THE INVENTION

Figure 1:
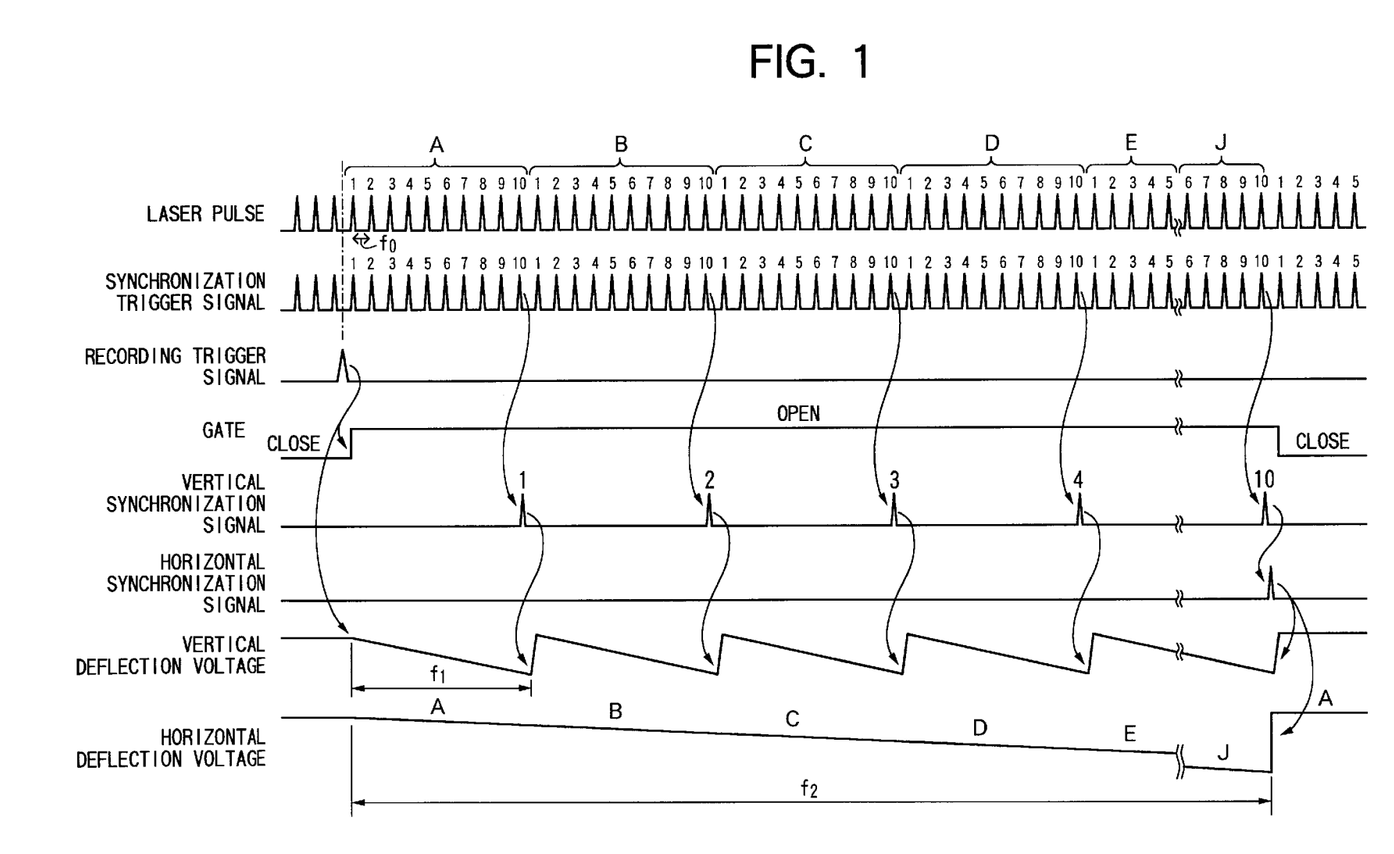
FIG. 1 is an operational timing chart applicable to a conventional optical beam spatial pattern recording device.

It is conceivable to apply voltages to the two pairs of deflection electrode plates as shown in a timing chart of FIG. 1. When the pulse repetition period of the inputted optical beam pulses is f0, the period f1 of a voltage applied to the vertical deflection electrodes satisfies the equation f1=f0×n1 (where n1 is an integer), and the period f2 of another voltage applied to the horizontal deflection electrodes satisfies the equation f2=f1×n2 (where n2 is an integer).

Description will be given below for the case where n1=n2=10.

In the streak tube, photoelectron pulses are swept at the period f1 in the vertical direction and at the period f2 in the horizontal direction. When the period f0 is sufficiently long relative to the pulsewidth of each optical beam pulse, the pulsewidth is short relative to the vertical sweeping speed. Accordingly, each beam pulse will not be affected by the vertical sweeping operation. The streak camera can therefore produce an output image, in which the spatial pattern of each optical beam pulse is not elongated in the vertical direction.

Figure 2:
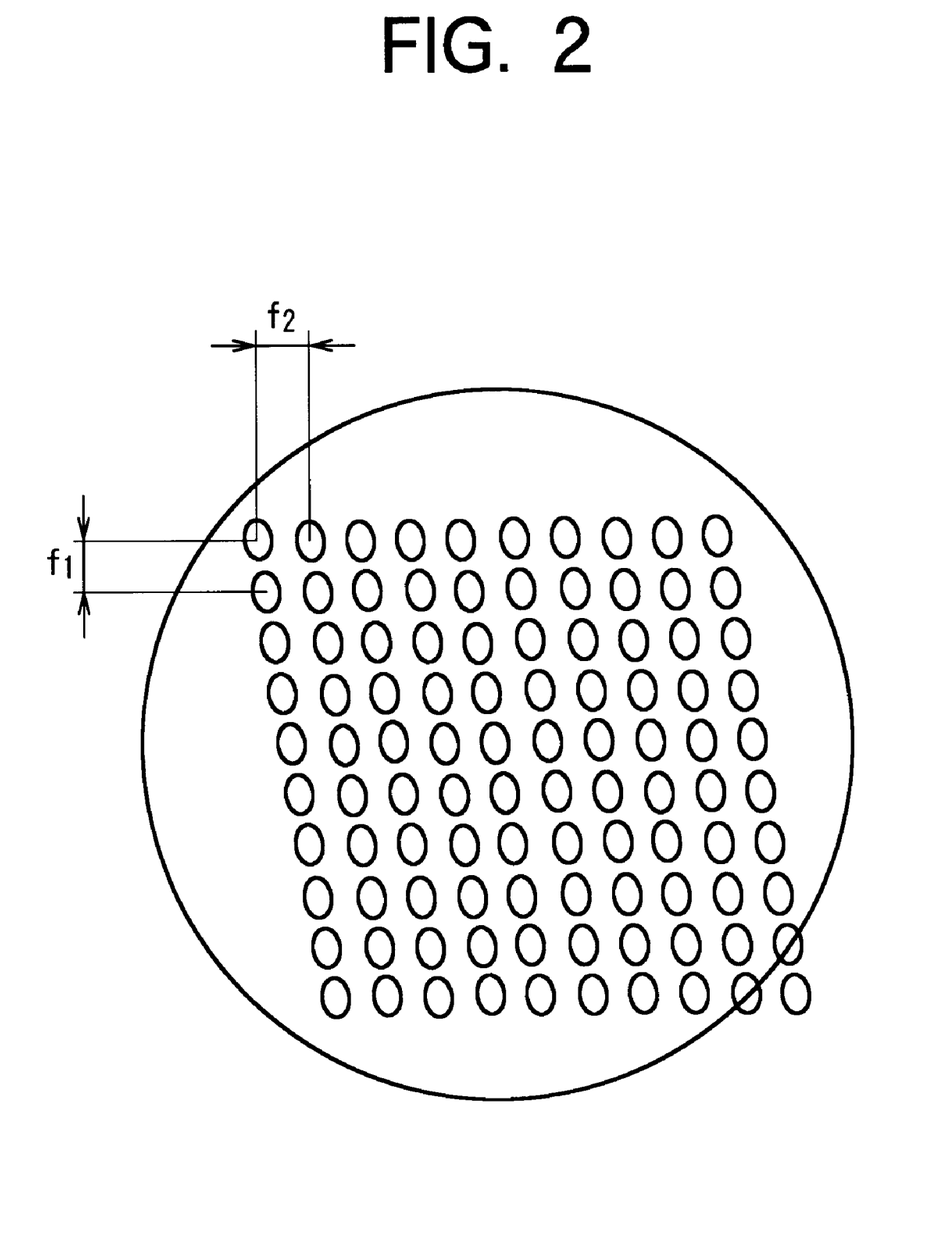
FIG. 2 illustrates an output image obtained by the conventional recording device when the recording device is operated as shown in FIG. 1.

When a phosphor screen is provided at the photoelectron detection portion, the phosphor screen displays an output image where one hundred optical beam spatial patterns are arranged in total. That is, as shown in FIG. 2, the n2 (=10) number of vertical columns are arranged in the horizontal direction. Each vertical column is slightly slanted and is comprised of the n1 (=10) number of optical beam spatial patterns.

As apparent from FIG. 2, however, the optical beam spatial patterns are arranged in the slightly slanted manner. Some optical beam patterns will be located outside of the phosphor screen in comparison with the case where the optical beam patterns are arranged regularly in a square shape. Accordingly, the total number of measurable beam patterns decreases. It is difficult to analyze the thus slantedly-arranged beam patterns through an image processing operation.

It is therefore, an object of the present invention to overcome the above-described drawbacks, and to provide an optical beam spatial pattern recording device of a streak camera type which is capable of regularly arranging optical beam patterns so as to be easily analyzed by an image analyzing device.

In order to attain the above and other objects, the present invention provides a streak camera device for recording temporal changes in a spatial pattern of an optical beam which repeatedly oscillates as successive ultra-short pulses at a high pulse repetition rate, the device comprising: a photoelectric conversion portion for receiving optical beam pulses to be measured, and for outputting photoelectrons in accordance with the intensity of the incident optical beam-pulses; a photoelectron detection portion for displaying intensity pattern of the photoelectrons; first and second pairs of deflection electrode plates provided between the photoelectric conversion portion and the photoelectron detection portion, the first and second pairs of deflection electrode plates deflecting the photoelectrons in first and second different directions which are perpendicular to each other; a timing control circuit outputting a synchronization trigger signal in synchronization with a pulse repetition frequency of the incident optical beam pulses; a first deflection electrode plate driving circuit supplying the first pair of deflection electrode plates with a first deflection voltage of a first repetitive wave whose repetition period is an integer multiple of a period of the synchronization trigger signal, thereby causing the first deflection electrode plates to generate a first deflection electric field in the first direction; and a second deflection electrode plate driving circuit supplying the second pair of deflection electrode plates with a second deflection voltage of a second repetitive wave so that the second deflection voltage repeatedly has a level-unchanged period where its level is unchanged, the level-unchanged period being equal to the period of the first deflection voltage, thereby causing the second deflection electrode plates to generate a second deflection electric field in the second direction.

The second deflection voltage of the second repetitive wave may generate the second deflection electric field of an unchanged value during each repetition period of the first deflection voltage.

The second repetitive wave may repeatedly change a level for each level-unchanged period, thereby repeatedly changing the amount of the second deflection electric field at a time interval corresponding to the repetition period of the first deflection voltage.

The second deflection voltage may be of a stepped wave whose level repeatedly changes in a stepped shape, the level of the second deflection voltage being unchanged during every short-period to form a corresponding stepped level, the short-period being equal to the period of the first deflection voltage.

The stepped wave may have a long-period during which the level of the stepped wave is repeatedly changed at the short-period, the long-period being equal to an integral multiple of the short-period.

The first deflection voltage may be of a sawtooth wave whose period is an integer multiple of the period of the synchronization trigger signal. The first deflection voltage may be of a sine wave whose period is an integer multiple of the period of the synchronization trigger signal.

According to another aspect, the present invention provides an optical beam spatial pattern recording device for recording temporal changes in a spatial pattern of an optical beam which repeatedly oscillates as ultra-short pulses at a high pulse repetition rate, the device comprising: a streak tube which includes a photoelectric conversion portion and a photoelectron detection portion at opposite ends of a tubular vacuum container and first and second pairs of deflection electrode plates, the photoelectric conversion portion outputting photoelectrons in accordance with the intensity of incident optical beam pulses, the photoelectron detection portion being provided with a phosphor screen for displaying an intensity pattern of the photoelectrons, the first and second pairs of deflection electrode plates being provided inside the vacuum container for deflecting the photoelectrons in two different directions perpendicular to each other; a high power electric source portion supplying an operational voltage to the streak tube; a timing control circuit outputting a synchronization trigger signal in synchronization with the pulse repetition frequency of the incident optical beam pulses; a first deflection electrode plate driving circuit supplying the first pair of deflection electrode plates with a first deflection voltage of a sine wave whose period is an integer multiple of a period of the synchronization trigger signal, thereby causing the first deflection electrode plates to generate a first deflection electric field; and a second deflection electrode plate driving circuit supplying the second pair of deflection electrode plates with a second deflection voltage of a stepped wave whose short-period is equal to the period of the first deflection voltage and whose long-period is an integral multiple of the short-period, thereby causing the second deflection electrode plates to generate a second deflection electric field.

According to a further aspect, the present invention provides an optical beam spatial pattern recording device for recording temporal changes in a spatial pattern of an optical beam which repeatedly oscillates as ultra-short pulses at a high pulse repetition rate, the device comprising: a streak tube which includes a photoelectric conversion portion and a photoelectron detection portion at opposite ends of a tubular vacuum container and first and second pairs of deflection electrode plates, the photoelectric conversion portion outputting photoelectrons in accordance with the intensity of incident optical beam pulses, the photoelectron detection portion being provided with a phosphor screen for displaying an intensity pattern of the photoelectrons, the first and second pairs of deflection electrode plates being provided inside the vacuum container for deflecting the photoelectrons in two different directions perpendicular to each other; a high power electric source portion supplying an operational voltage to the streak tube; a timing control circuit outputting a synchronization trigger signal in synchronization with the pulse repetition frequency of the incident optical beam pulses; a first deflection electrode plate driving circuit supplying the first pair of deflection electrode plates with a first deflection voltage of a sawtooth wave whose period is an integer multiple of a period of the synchronization trigger signal, thereby causing the first deflection electrode plates to generate a first deflection electric field; and a second deflection electrode plate driving circuit supplying the second pair of deflection electrode plates with a second deflection voltage of a stepped wave whose short-period is equal to the period of the first deflection voltage and whose long-period is an integral multiple of the short-period, thereby causing the second An deflection electrode plates to generate a second deflection electric field.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

An optical beam spatial pattern recording device according to a preferred embodiment of the present invention will be described while referring to the accompanying drawings wherein like parts and components are designated by the same reference numerals.

Figure 3:
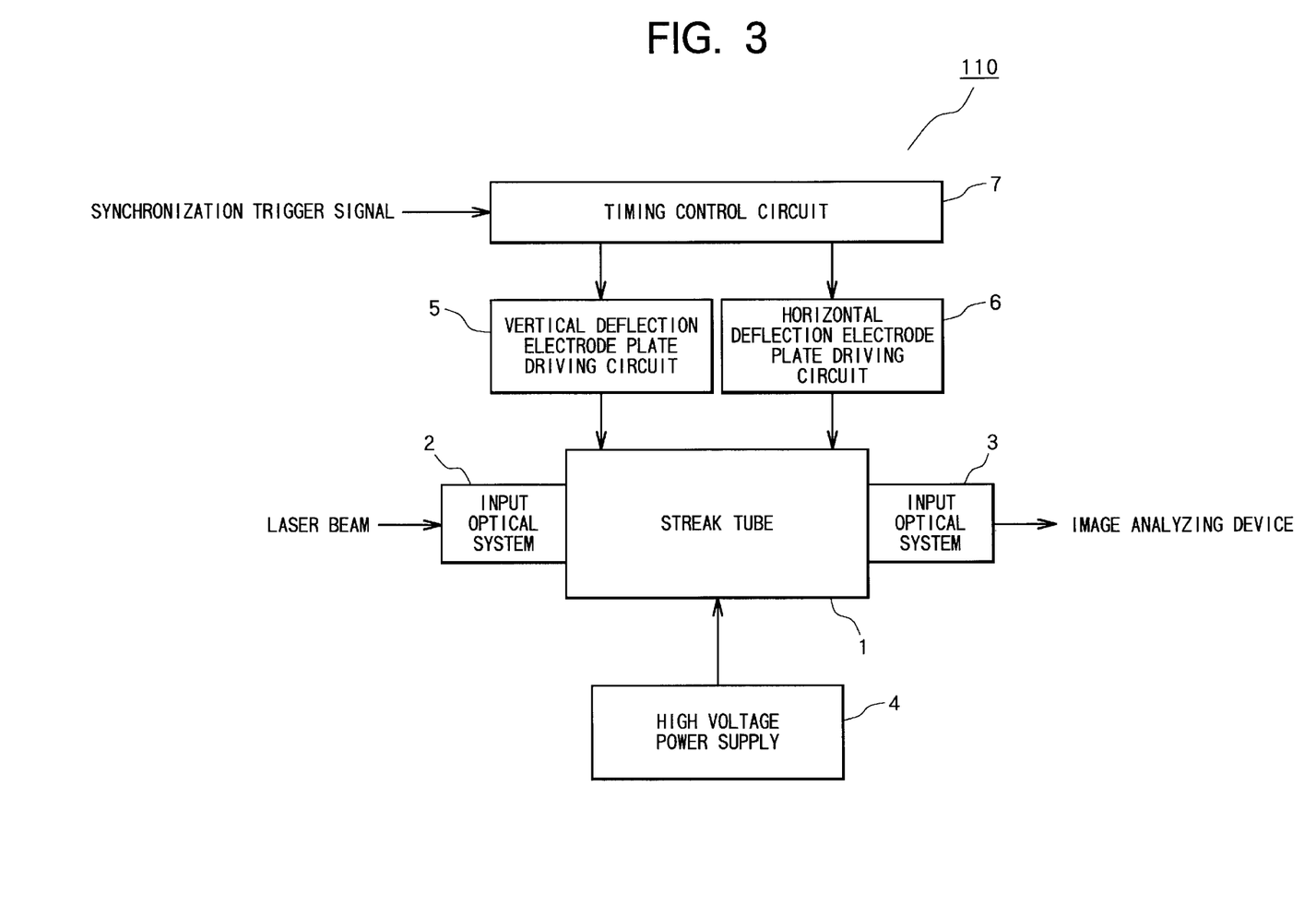
FIG. 3 is a block diagram showing an entire structure of an optical beam spatial pattern recording device of an embodiment of the present invention.
Figure 4:
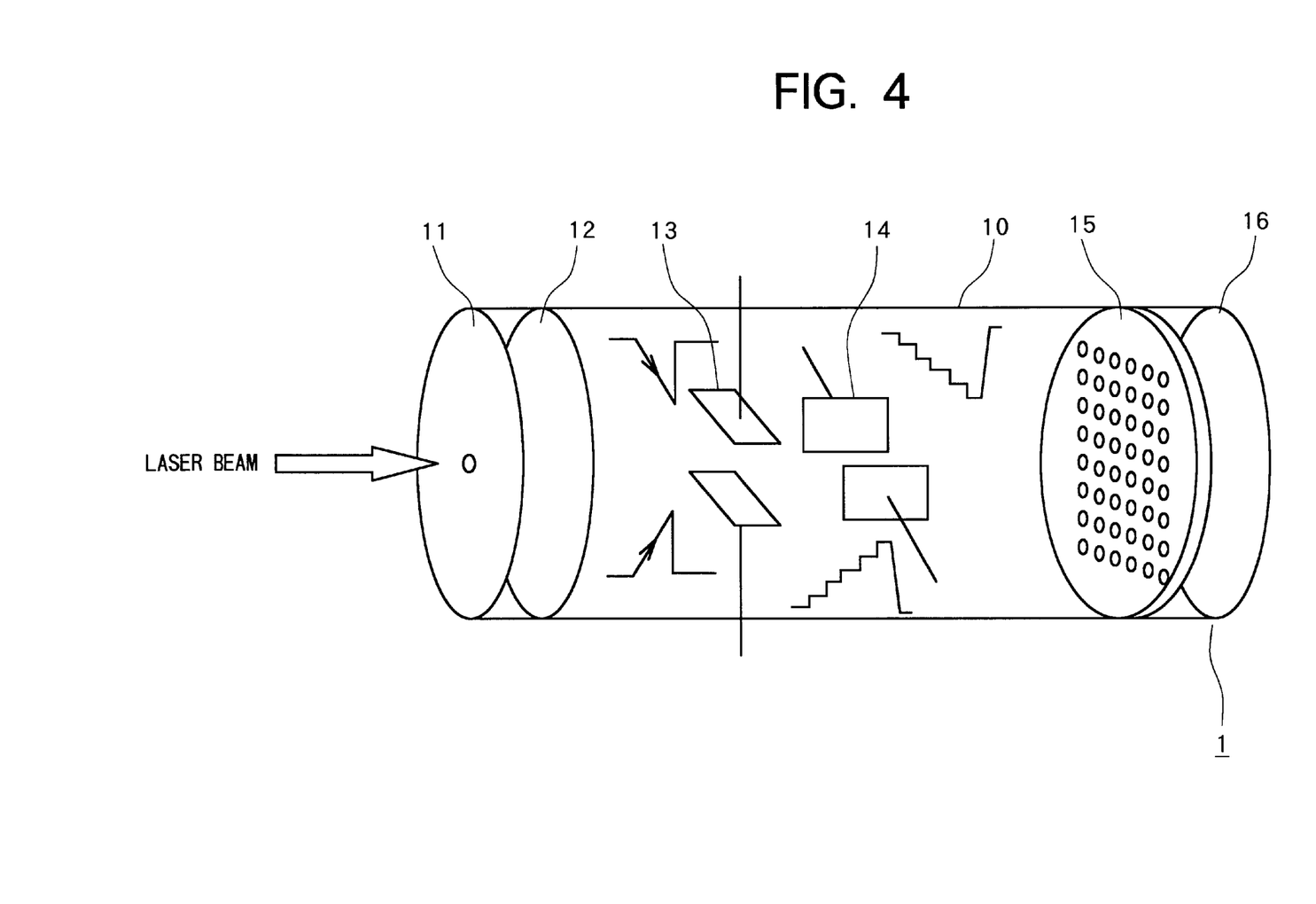
FIG. 4 shows a structure of a streak tube employed in the device of the present embodiment.

FIG. 3 is a block diagram of an entire portion of the optical beam spatial pattern recording device 110 of the present embodiment. FIG. 4 shows a structure of a streak tube 1 employed in the device 110.

First, the entire device 110 will be described below with reference to FIG. 3.

The basic structure of the device 110 of the present embodiment is the same as a double-sweeping type streak camera. That is, the recording device 110 includes: the streak tube 1; an input optical system 2; and an output optical system 3. The input optical system 2 and the output optical system 3 are optically connected to the streak tube 1. The streak tube 1 is provided with two pairs of deflection electrodes which are located perpendicularly to one another. The input optical system 2 is for guiding an input optical beam to the streak tube 1. The output optical system 3 is for guiding an output beam from the streak tube 1 to an image analyzing device.

The streak tube 1 is electrically connected to: a high voltage power supply 4; a vertical deflection electrode plate driving circuit 5; and a horizontal deflection electrode plate driving circuit 6. The high voltage power supply 4 is for supplying operational voltages to the streak tube 1. The vertical deflection electrode plate driving circuit 5 and the horizontal deflection electrode plate driving circuit 6 are for supplying the two pairs of deflection electrode plates with deflection voltages. The vertical deflection electrode plate driving circuit 5 and the horizontal deflection electrode plate driving circuit 6 control deflection voltages supplied to the deflection electrode plates in response to a synchronization signal supplied from a timing control circuit 7.

Next, the structure of the streak tube 1 will be described with reference to FIG. 4.

The streak tube 1 is constructed from a tubular vacuum envelope 10 in which a photocathode 11, an accelerating electrode 12, a pair of vertical deflection plates 13, a pair of horizontal deflection plates 14, a microchannel plate (MCP) 15, and a phosphor screen 16 are arranged in this order from an optical beam input side. The photocathode 11, the accelerating electrode 12, the microchannel plate (MCP) 15, and the phosphor screen 16 are located parallel to each other. That is, each of these elements 11, 12, 15, and 16 extends in a direction normal to an axial direction of the tubular vacuum container 10.

The pair of vertical deflection plates 13 and the pair of horizontal deflection plates 14 are located so that their sweeping directions are perpendicular to each other.

With the above-described structure, the recording device 110 operates as described below.

It is now assumed that the recording device 110 is controlled to measure synchrotron emission.

Figure 5:
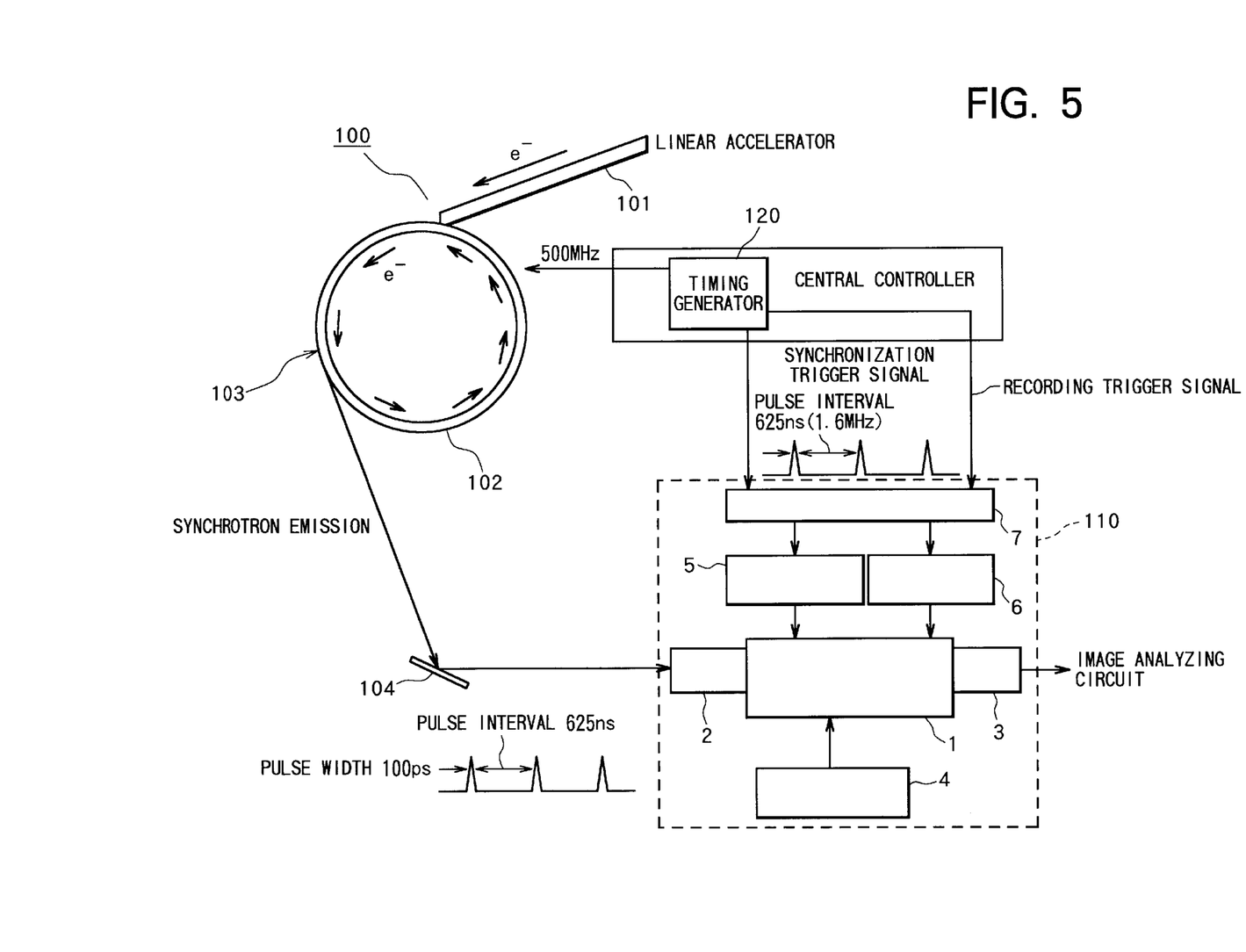
FIG. 5 illustrates one example how the device of the present invention is used.

As shown in FIG. 5, an electron is fully accelerated by a linear accelerator 101 before being further accelerated in a synchrotron emission ring 102 while repeatedly traveling along a closed circular orbit defined by the emission ring 102. A synchrotron emission beam is outputted from an output port 103 of the synchrotron emission ring 102. The synchrotron emission beam is then reflected by a mirror 104 or the like so as to be guided to the recording device 110. Both of the synchrotron 100 and the recording device 110 are controlled in accordance with timing signals supplied from a timing generator 120 which is provided in a central controller.

The synchrotron emission ring 102, i.e., the closed circular orbit has a diameter of about 60 meters. Electrons accelerated by the synchrotron emission ring 102 travel along the entire circular orbit at 625 nanoseconds. The output port 103 therefore repeatedly outputs optical beam pulses at a repetition frequency of 625 nanoseconds (=1.6 MHz). The optical beam pulses are ultra-short pulses with a pulsewidth of about 100 picoseconds.

Figure 6:
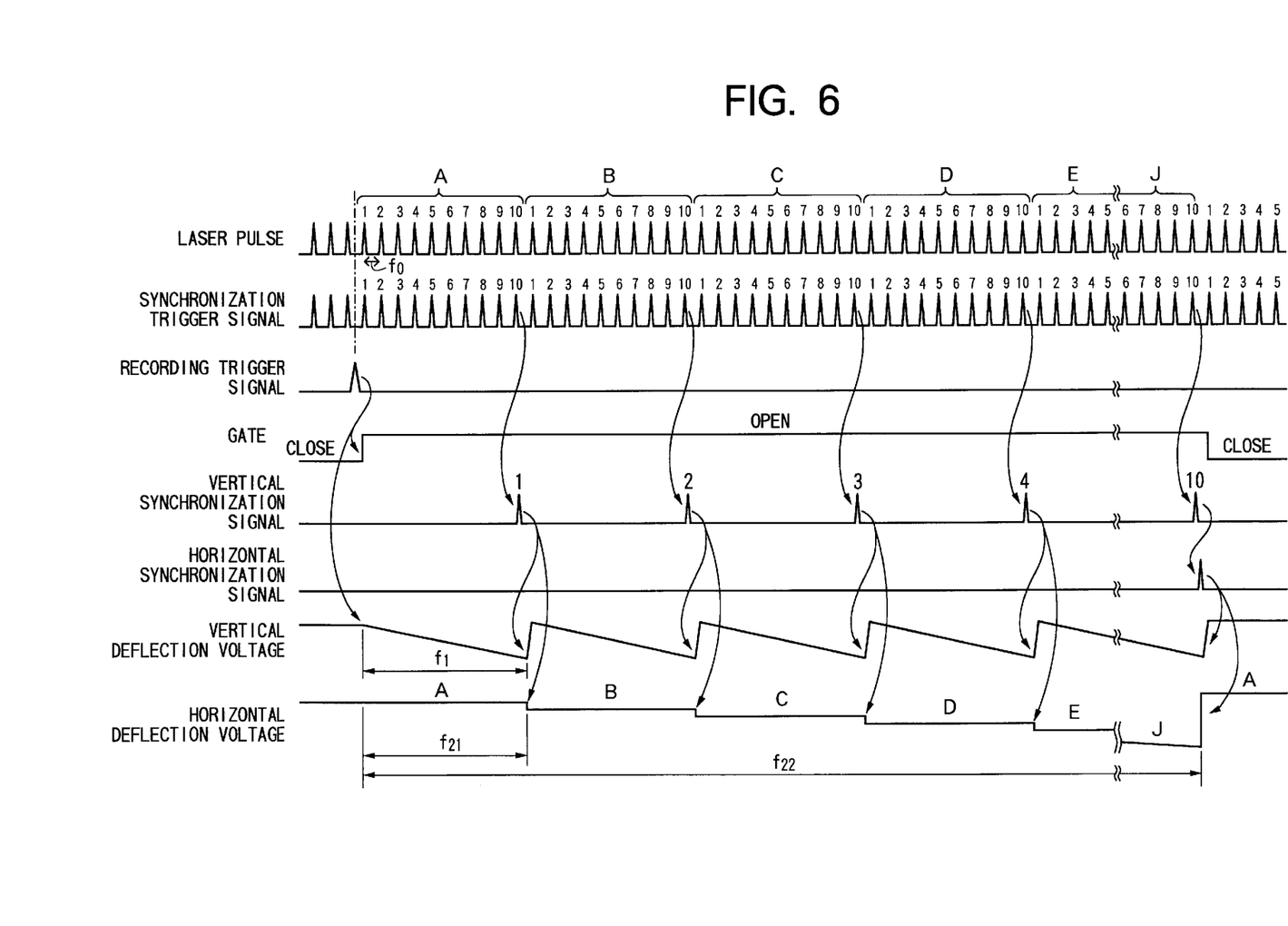
FIG. 6 is an operational timing chart for the recording device of the present embodiment.

FIG. 6 shows timing charts for the control of the recording device 110.

In order to start measurement, the timing generator 120 shown in FIG. 5 supplies the timing control circuit 7 with synchronization trigger signals and recording trigger signals. The synchronization trigger signals are synchronous with the optical beam pulses. The recording trigger signals indicate start and end timings of the data recording operation. The optical beam pulses emitted from the ring 102 are guided to the streak camera 1 with the mirror or the like 104, and measurement is started in response to a recording trigger signal.

The timing control circuit 7 generates horizontal synchronization signals and vertical synchronization signals in response to the synchronization trigger signals. In response to these signals, the vertical deflection electrode plate driving circuit 5 and the horizontal deflection electrode plate driving circuit 6 control the vertical deflection voltage and the horizontal deflection voltage.

It is now assumed that the pulse repetition period of the optical beam pulses is f0. The vertical deflection voltage is of a sawtooth wave with a period f1 which satisfies the equation $f1=f0 \times n1$ (where n1 is an integer). The horizontal deflection voltage is of a stepped wave whose short-period f21 is equal to the period f1 and whose longperiod f22 satisfies the equation $f22=f1 \times n2$ (where n2 is an integer). In each short-period f21, the horizontal deflection voltage is not changed. The horizontal deflection voltage is changed step by step at an interval of f21. In each long-period f22, the n2 number of steps are created by the horizontal deflection voltage which is repeatedly changed at the time interval f21. The horizontal deflection voltage is controlled back to the original amount when the period f22 passes after the start of the sweeping operation. In FIG. 6, the n2 number of steps with levels of "A" through "J" are created by the horizontal deflection voltage which is repeatedly changed at the time interval f21. Then, the horizontal deflection voltage is changed from the level "J" back to the original level "A".

Following description will be given for the case where n1=n2=10. In this case, the period f1 of the vertical deflection voltage and the short-period f21 of the horizontal deflection voltage are equal to 6,250 nanoseconds, i.e., 6.25 μs. The long-period f22 of the horizontal deflection voltage is equal to 62.5 μs.

Next, the operation of the streak tube 1 will be described.

Figure 7:
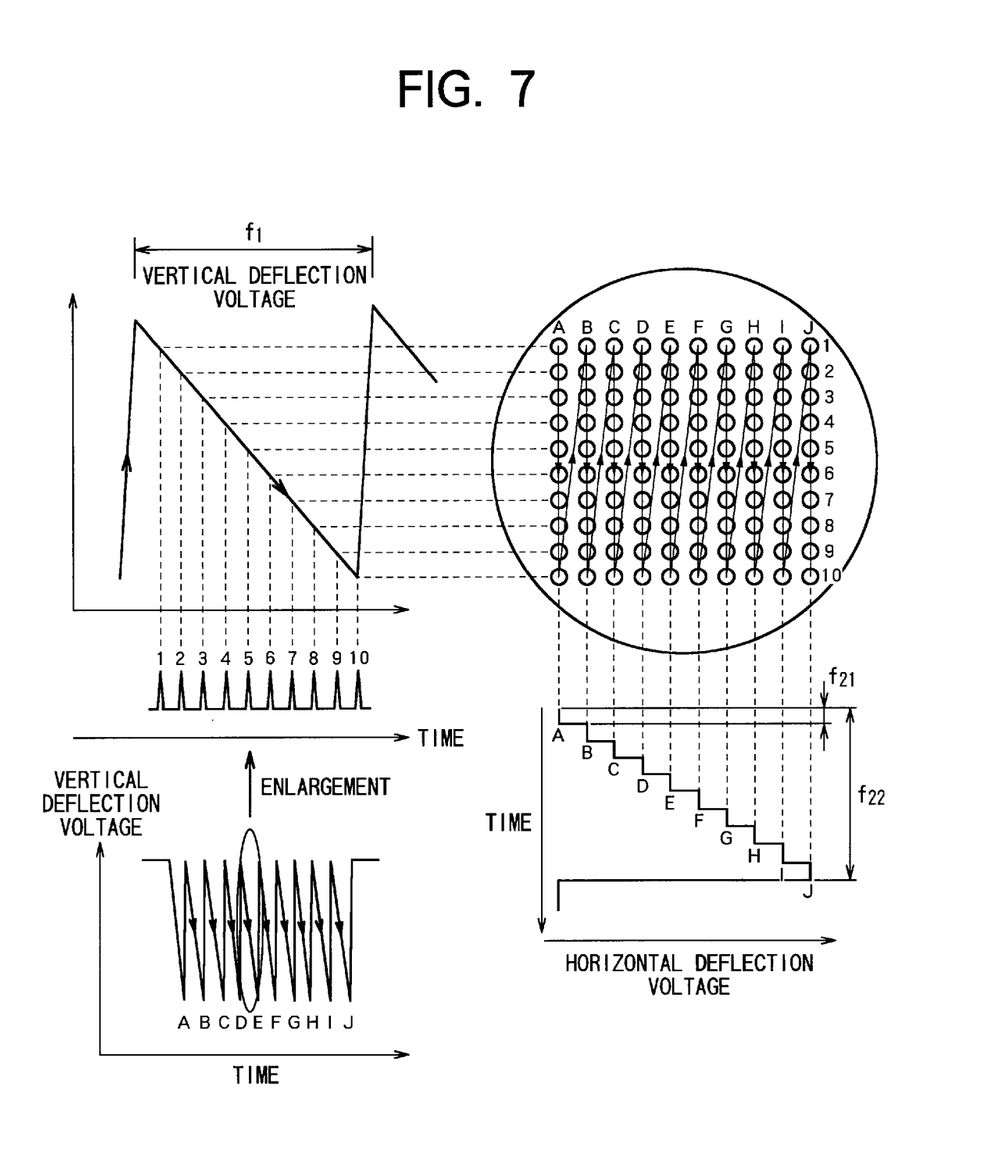
FIG. 7 illustrates how scanning operation is achieved by the recording device of the present embodiment.

When optical beam pulses fall incident on an input surface of the photocathode 11 in FIG. 4, photoelectron pulses emit from a surface of the photocathode 11 opposite to the input surface. The photoelectron pulses are guided to the phosphor screen 16 by the accelerating electrode 12. The vertical deflection plates 13, now applied with the vertical deflection voltage, generate an electric field to vertically sweep the photoelectron pulses. As a result, when viewed from the phosphor screen side 16, ten pulse outputs are successively generated in a downward direction as shown in FIG. 7. Finally, one vertical column is generated from the ten pulse outputs.

More specifically, at the first stage, the first column A is produced from ten pulses numbered from one to ten. Next, the horizontal deflection plates 14, now being supplied with the horizontal electric voltage, changes the amount of an electric field for horizontally guiding the photoelectron pulses. As a result, the pulse output scanning position moves from the A columnar position to a B columnar position, that is located next to the column A in the horizontal direction. Then, the vertical scanning to operation is performed again by the sweeping vertical deflection voltage.

The above-described operation is repeatedly performed. That is, a sawtooth wave-shaped sweeping is performed for the vertical deflection while a stepped wave-shaped sweeping is performed for the horizontal deflection as shown in FIG. 7. When a period of time equal to the long-period f22 has passed from the measurement start timing, one hundred pulse outputs are successively produced and swept by the deflection voltages. As a result, ten vertical columns of pulse outputs are arranged in the horizontal direction. Each vertical column is comprised of vertically-arranged ten pulse outputs.

Figure 8:
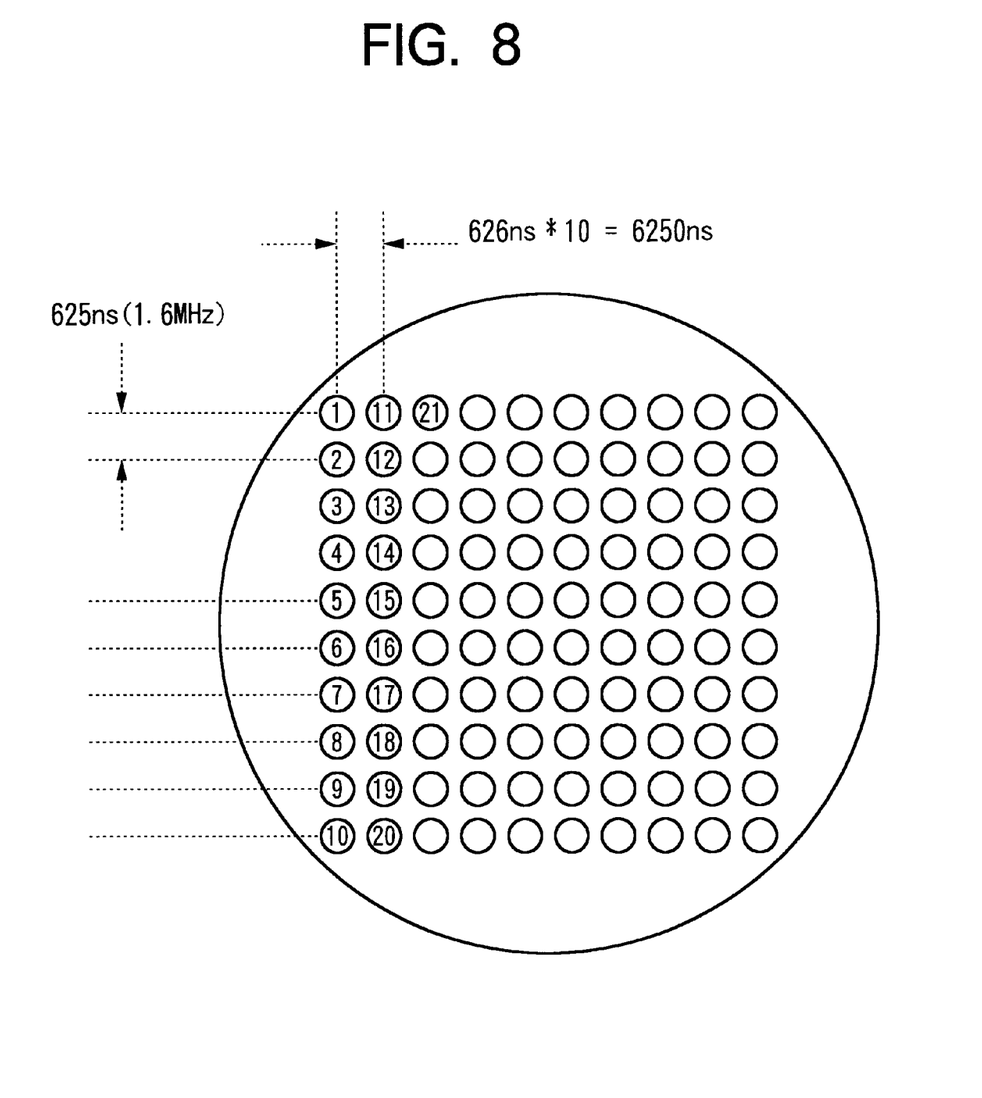
FIG. 8 illustrates an output image obtained by the recording device of the present embodiment.

The thus swept photoelectron pulses are then multiplied by the MCP 15 and collide against the phosphor screen 16. As a result, the phosphor screen 16 displays an image representative of spatial patterns of the one hundred optical beam pulses as shown in FIG. 8. According to this example, the duty ratio of the optical beam pulses is very high. In other words, the ratio between the pulse repetition period with respect to the pulsewidth is 6,250/1. The pulsewidth is therefore considerably small relative to the sweeping speed in the vertical direction. Accordingly, the shift amount of the pulse recording position due to the sweeping operation during every pulse oscillation time is very small and is therefore negligible. Accordingly, the output image of each beam pulse will not be elongated in the vertical direction.

In the output pulse image of FIG. 8, time shift amount between the successively vertically-arranged pulses is 625 nanoseconds. The time shift amount between the horizontally-arranged pulses is 6,250 nanoseconds (=625 nanoseconds×10=6.25 μs). In other words, the screen 16 is formed with one hundred pulses in total which are successively generated within a time period of 62.5 μs.

Figure 9:
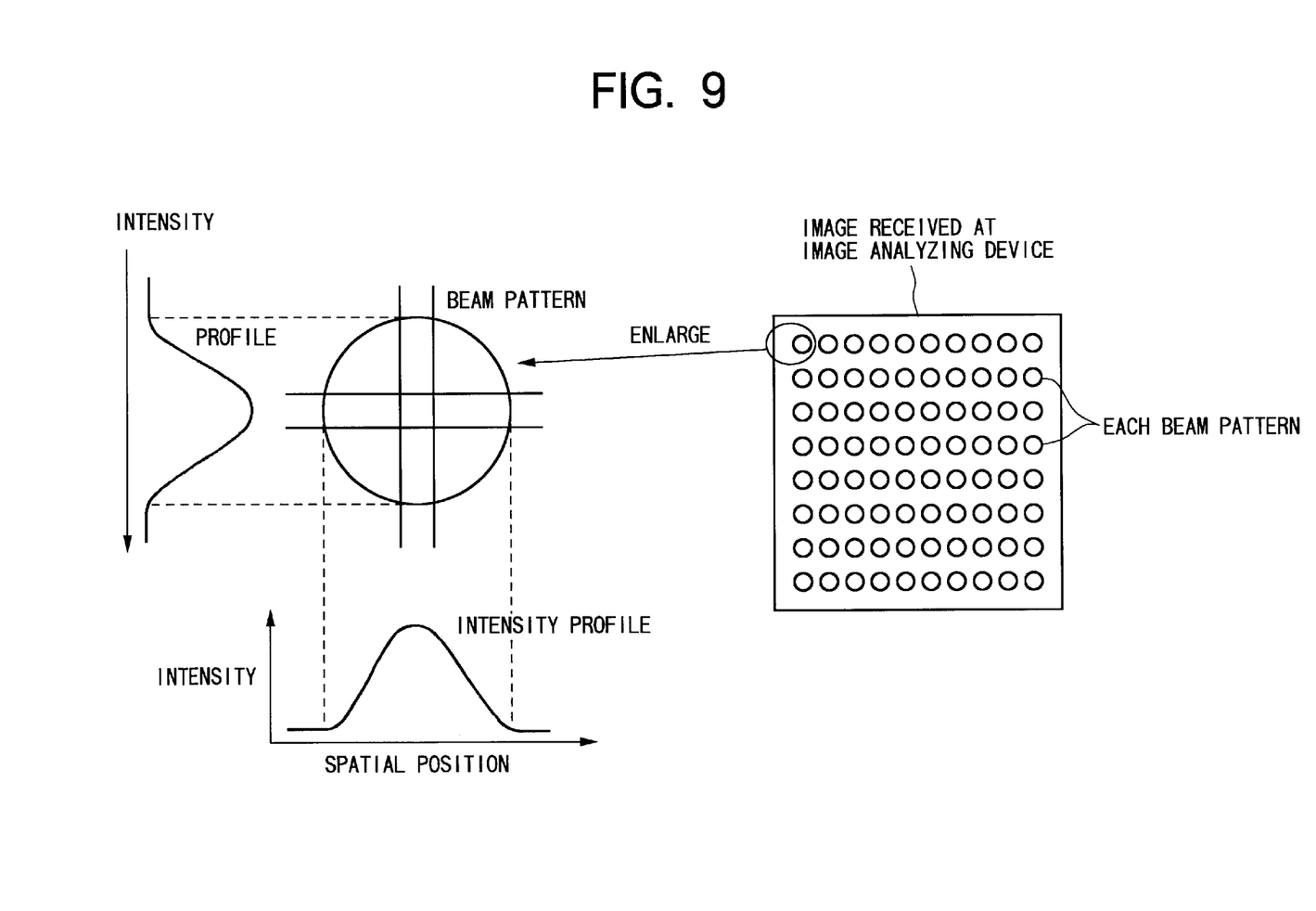
FIG. 9 illustrates how the output image of FIG. 8 is analyzed.

The output image is then transferred to the image analyzing device. As shown in FIG. 9, the image analyzing device calculates an intensity profile of each pulse output. The image analyzing device then calculates the diameter of the pulse output, the gravitational center of the pulse output, intensity distribution of the pulse output, and the like.

As described above, according to the present embodiment, the stepped-wave horizontal deflection voltage is used. During each vertical scanning period, therefore, the amount of the horizontal deflection voltage does not change. The optical pulses are therefore deflected in the horizontal direction at a fixed deflection amount during each vertical scanning period. Accordingly, the resultant pulse outputs do not shift in the horizontal direction while they are swept in the vertical direction. In the output image, therefore, the successive pulse outputs are regularly arranged in a grid manner. The image analyzing device can easily analyze the output image.

According to the conceivable operation as shown in FIG. 1, pulse outputs are shifted horizontally in the resultant image as shown in FIG. 2. Accordingly, it is necessary to provide the recording device with an optical system having a small magnification rate so as to decrease the size of each pulse output. Contrarily, according to the recording device 110 of the present embodiment, the one hundred pulse outputs are properly arranged in a square shape and therefore are properly received in the phosphor screen 16. It is unnecessary to decrease the size of each pulse output. It is therefore possible to obtain a large amount of data at a time. Because the pulse outputs are arranged regularly in the output image, the image analyzing device can accurately measure the shift amount of a periphery of each pulse from its central position and deviation in spatial distribution of energy in each pulse beam.

As described above, according to the present embodiment, the pair of vertical deflection electrode plates 13 in the double sweeping streak camera 1 are supplied with voltages of sawtooth waves in synchronization with the input optical beam pulses. The pair of horizontal deflection electrode plates 14 are supplied with voltages of stepped waves in synchronization with the sawtooth waves. The deflection electrode plates 13 and 14 sweep the optical beam pulses horizontally and vertically. Thus swept photoelectrons are detected at the phosphor screen 16. The phosphor screen 16 is therefore recorded with an image of regularly-arranged optical beam patterns which represent temporal changes in the spatial pattern of the optical beam. Accordingly, the image analyzing device can easily analyze the image. The image analyzing device can accurately measure a shift amount of a periphery of each beam pulse from its central position and deviation in spatial distribution of energy in each beam pulse.

In the above description, each horizontal scanning operation is performed following a corresponding vertical scanning operation. However, the vertical scanning operation may be performed following the horizontal scanning operation.

Figure 10:
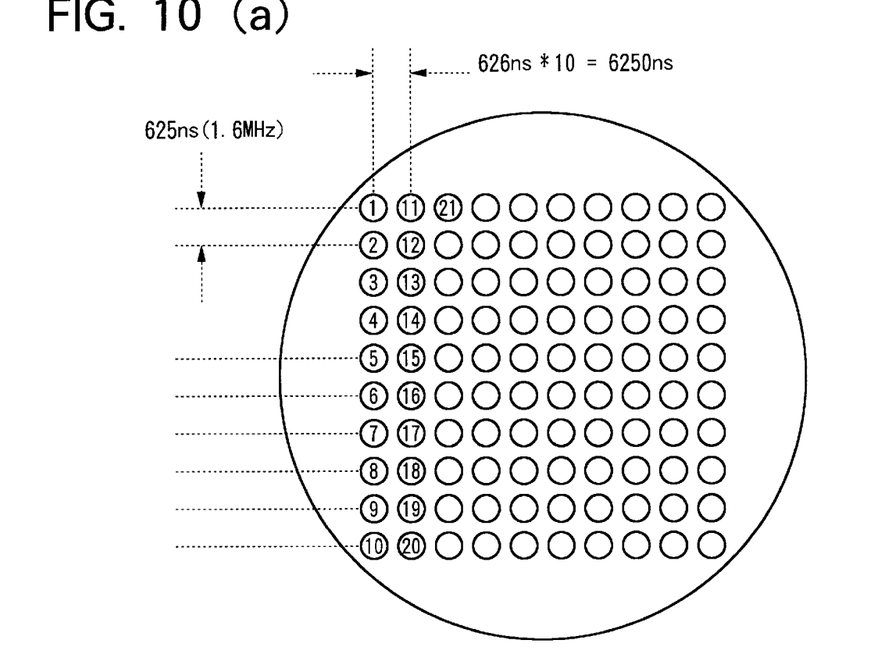
FIGS. 10(a) through 10(c) illustrate how scanning operation is achieved.

In place of the sawtooth wave voltage, a sine wave voltage can be used as the vertical deflection voltage. In this case, the time sequence in the spatial beam pattern between adjacent columns will be reversed. More specifically, in the above-description, at each vertical column, the optical beam is swept downwardly as shown in FIG. 10(*a*). However, when using the sine wave, when the optical beam is swept downwardly at one column, the optical beam will be swept upwardly at the next column as shown in FIG. 10(*b*). It is noted that even when using the sawtooth wave, if both of a rising phase and a falling phase of the sawtooth wave are used, as shown in FIG. 10(c), the optical beam will be swept in the same manner as in FIG. 10(b). The sine wave can be obtained through deforming the upper and lower peaks of the sawtooth wave of FIG. 10(c) into curved shapes. As apparent from the drawings, in those cases, it is still possible to obtain an output image where the pulse outputs are arranged regularly.

The vertical and horizontal sweeping speeds are not limited to the values employed in the above-described embodiment. Those speeds can be freely set. The number of optical beams recordable at a time can be adjusted in accordance with the operability of the image analyzing device and the size of the optical beam to be measured.

The basic structure of the recording device of the present embodiment is the same as that of the conventional streak camera. Accordingly, the present invention can be provided as an additional function of the conventional streak camera. It is therefore possible to record temporal changes in the spatial pattern of the optical beam at low cost.

Figure 11:
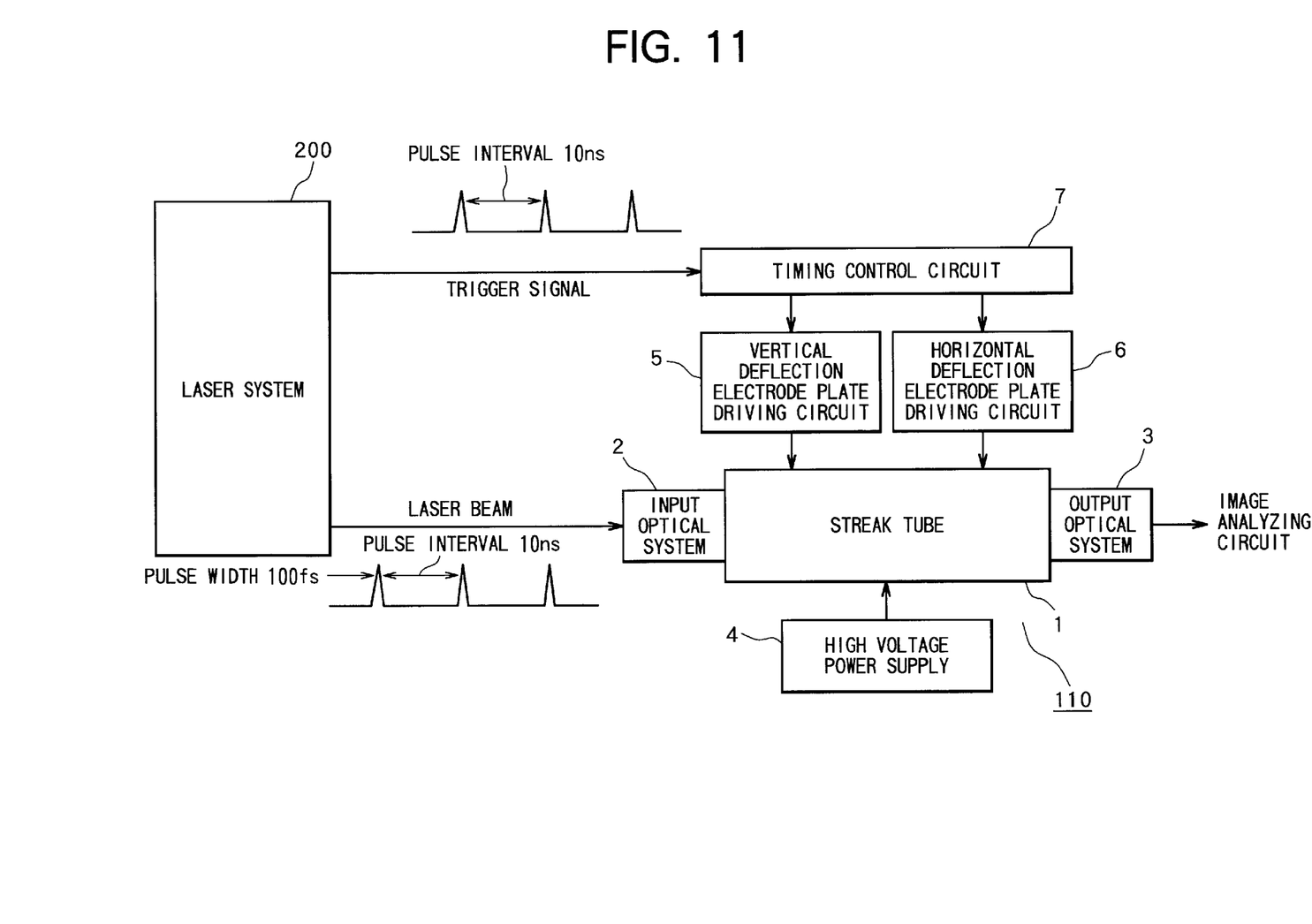
FIG. 11 illustrates another example how the device of the present invention is used.

The present invention is not limited to measurement of synchrotron radiation, but can be used to measure an ultra-short pulse such as a TiSa laser beam as shown in FIG. 11. In this case, a laser system 200 is designed so that the laser beam is inputted also into an optical element such as a photodiode. The photodiode outputs trigger signals. The trigger signals are used in the timing control circuit 7. Or, the laser system 200 may be designed so that a system controller (not shown) provided to the laser system 200 outputs synchronization signals.

As described above, according to the present embodiment, one of the two sweeping electrodes in the double sweeping streak camera is supplied with an electric voltage of a sawtooth wave or a sine wave in synchronization with the input optical beam pulses. The other sweeping electrode is supplied with an electric voltage of a stepped wave in synchronization with the input optical beam pulses. The photoelectron detection portion is provided with the phosphor screen. The phosphor screen is therefore recorded with an output image where optical beam pulses are arranged regularly. The output image represents temporal changes in the spatial pattern of the optical beam. Accordingly, the image analyzing device can easily analyze the temporal changes. The image analyzing device can accurately measure a shift amount of a periphery of the beam from its central position and spatial distribution in energy of the output beam.

As described above, the optical beam spatial pattern recording device of the present embodiment is provided for recording temporal changes in the spatial pattern of an optical beam which repeatedly oscillates with an ultra-short pulsewidth at a high pulse repetition frequency. The optical beam spatial pattern recording device includes a streak tube. The streak tube includes a photoelectric conversion portion and a photoelectron detection portion at opposite ends of a tubular vacuum container and two pairs of deflection electrode plates between the photoelectric conversion portion and the photoelectron detection portion. The photoelectric conversion portion outputs photoelectrons in accordance with the intensity of the incident optical beam pulses. The photoelectron detection portion is provided with the phosphor screen for displaying intensity pattern of each photoelectron. The two pairs of deflection electrode plates are provided inside the vacuum container for deflecting the photoelectrons in two different directions which are perpendicular to each other. The high power electric source portion supplies an operation voltage to the streak tube. The timing control circuit outputs synchronization trigger signals in synchronization with the pulse repetition frequency of the incident optical beam. The first deflection electrode plate driving circuit supplies the first pair of deflection electrode plates with a voltage of a sine wave or of a sawtooth wave whose period is an integer multiple of the period of the synchronization trigger signals, thereby causing the first deflection electrode plates to generate a first deflection electric field. The second deflection electrode plate driving circuit supplies the second pair of deflection electrode plates with a voltage of a stepped wave whose short-period is equal to the period of the deflection voltage, which the first deflection electrode plate driving circuit applies to the first deflection electrode plates, and whose long-period is an integral multiple of the short-period, thereby causing the second deflection electrode plates to generate a second deflection electric field.

Accordingly, the recording device can record a single image with a sufficient amount of data. The image represents temporal changes in the spatial pattern of the optical beam in the ultra-short pulsewidth. While the successively-generated photoelectrons are deflected in the vertical direction, the deflection width in which the photoelectrons are deflected in the horizontal direction can be maintained at a fixed amount. Accordingly, the optical receiving surface is recorded with regularly-arranged pulse beam outputs.

While the invention has been described in detail with reference to the specific embodiment thereof, it would be apparent to those skilled in the art that various changes and modifications may be made therein without departing from the spirit of the invention.

What is claimed is:

1. A streak camera device for recording temporal changes in a spatial pattern of an optical beam which repeatedly oscillates as successive ultra-short pulses at a high pulse repetition rate, the device comprising:

a photoelectric conversion portion for receiving optical beam pulses to be measured, and for outputting photoelectrons in accordance with the intensity of the incident optical beam pulses;

a photoelectron detection portion for displaying intensity pattern of the photoelectrons;

first and second pairs of deflection electrode plates provided between the photoelectric conversion portion and the photoelectron detection portion, the first and second pairs of deflection electrode plates deflecting the photoelectrons in first and second different directions which are perpendicular to each other;

a timing control circuit outputting a synchronization trigger signal in synchronization with a pulse repetition frequency of the incident optical beam pulses;

a first deflection electrode plate driving circuit supplying the first pair of deflection electrode plates with a first deflection voltage of a first repetitive wave whose repetition period is an integer multiple of a period of the synchronization trigger signal, thereby causing the first deflection electrode plates to generate a first deflection electric field in the first direction; and a second deflection electrode plate driving circuit supplying the second pair of deflection electrode plates with a second deflection voltage of a second repetitive wave so that the second deflection voltage repeatedly has a level-unchanged period where its level is unchanged, the level-unchanged period being equal to the period of the first deflection voltage, thereby causing the second deflection electrode plates to generate a second deflection electric field in the second direction.

2. A streak camera device as claimed in claim 1, wherein the second deflection voltage of the second repetitive wave generates the second deflection electric field of an unchanged value during each repetition period of the first deflection voltage.

3. A streak camera device as claimed in claim 2, wherein the second repetitive wave repeatedly changes a level for each level-unchanged period, thereby repeatedly changing the amount of the second deflection electric field at a time interval corresponding to the repetition period of the first deflection voltage.

4. A streak camera device as claimed in claim 3, wherein the second deflection voltage is of a stepped wave whose level repeatedly changes in a stepped shape, the level of the second deflection voltage being unchanged during every short-period to form a corresponding stepped level, the short-period being equal to the period of the first deflection voltage.

5. A streak camera device as claimed in claim 3, wherein the stepped wave has a long-period during which the level of the stepped wave is repeatedly changed at the short-period, the long-period being equal to an integral multiple of the short-period.

6. A streak camera device as claimed in claim 5, wherein the first deflection voltage is of a sawtooth wave whose period is an integer multiple of the period of the synchronization trigger signal.

7. A streak camera device as claimed in claim 5, wherein the first deflection voltage is of a sine wave whose period is an integer multiple of the period of the synchronization trigger signal.

8. An optical beam spatial pattern recording device for recording temporal changes in a spatial pattern of an optical beam which repeatedly oscillates as ultra-short pulses at a high pulse repetition rate, the device comprising:

a streak tube which includes a photoelectric conversion portion and a photoelectron detection portion at opposite ends of a tubular vacuum container and first and second pairs of deflection electrode plates, the photoelectric conversion portion outputting photoelectrons in accordance with the intensity of incident optical beam pulses, the photoelectron detection portion being provided with a phosphor screen for displaying an intensity pattern of the photoelectrons, the first and second pairs of deflection electrode plates being provided inside the vacuum container for deflecting the photoelectrons in two different directions perpendicular to each other;

a high power electric source portion supplying an operational voltage to the streak tube;

a timing control circuit outputting a synchronization trigger signal in synchronization with the pulse repetition frequency of the incident optical beam pulses;

a first deflection electrode plate driving circuit supplying the first pair of deflection electrode plates with a first deflection voltage of a sine wave whose period is an integer multiple of a period of the synchronization trigger signal, thereby causing the first deflection electrode plates to generate a first deflection electric field; and a second deflection electrode plate driving circuit supplying the second pair of deflection electrode plates with a second deflection voltage of a stepped wave whose short-period is equal to the period of the first deflection voltage and whose long-period is an integral multiple of the short-period, thereby causing the second deflection electrode plates to generate a second deflection electric field.

9. An optical beam spatial pattern recording device for recording temporal changes in a spatial pattern of an optical beam which repeatedly oscillates as ultra-short pulses at a high pulse repetition rate, the device comprising:

a streak tube which includes a photoelectric conversion portion and a photoelectron detection portion at opposite ends of a tubular vacuum container and first and second pairs of deflection electrode plates, the photoelectric conversion portion outputting photoelectrons in accordance with the intensity of incident optical beam pulses, the photoelectron detection portion being provided with a phosphor screen for displaying an intensity pattern of the photoelectrons, the first and second pairs of deflection electrode plates being provided inside the vacuum container for deflecting the photoelectrons in two different directions perpendicular to each other;

a high power electric source portion supplying an operational voltage to the streak tube;

a timing control circuit outputting a synchronization trigger signal in synchronization with the pulse repetition frequency of the incident optical beam pulses;

a first deflection electrode plate driving circuit supplying the first pair of deflection electrode plates with a first deflection voltage of a sawtooth wave whose period is an integer multiple of a period of the synchronization trigger signal, thereby causing the first deflection electrode plates to generate a first deflection electric field; and a second deflection electrode plate driving circuit supplying the second pair of deflection electrode plates with a second deflection voltage of a stepped wave whose short-period is equal to the period of the first deflection voltage and whose long-period is an integral multiple of the short-period, thereby causing the second deflection electrode plates to generate a second deflection electric field.

* * * * *